United States Patent Office

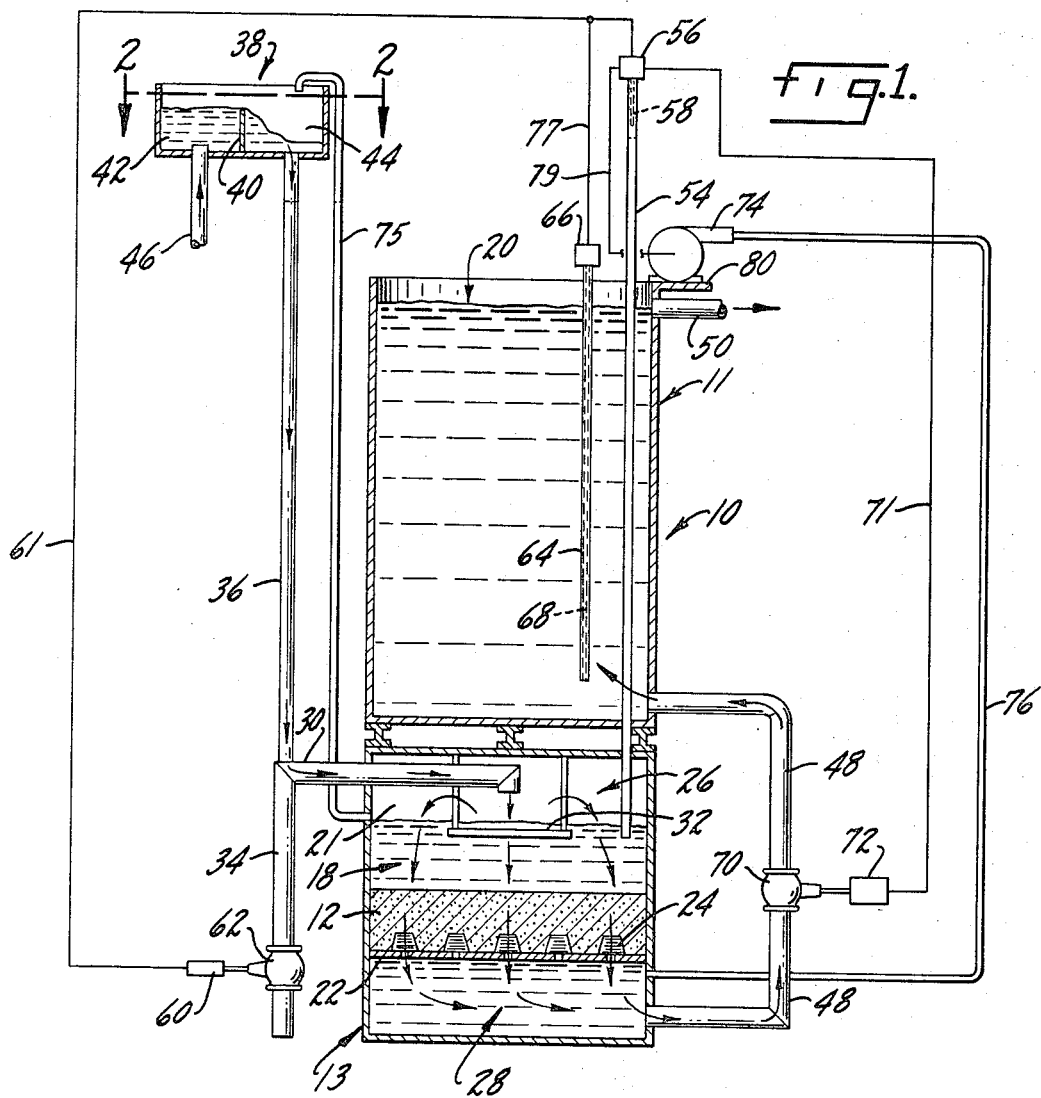
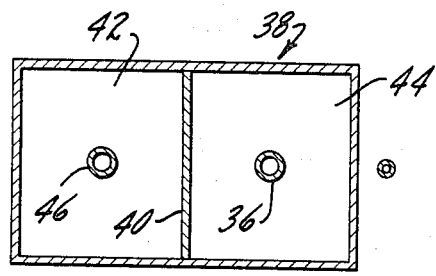

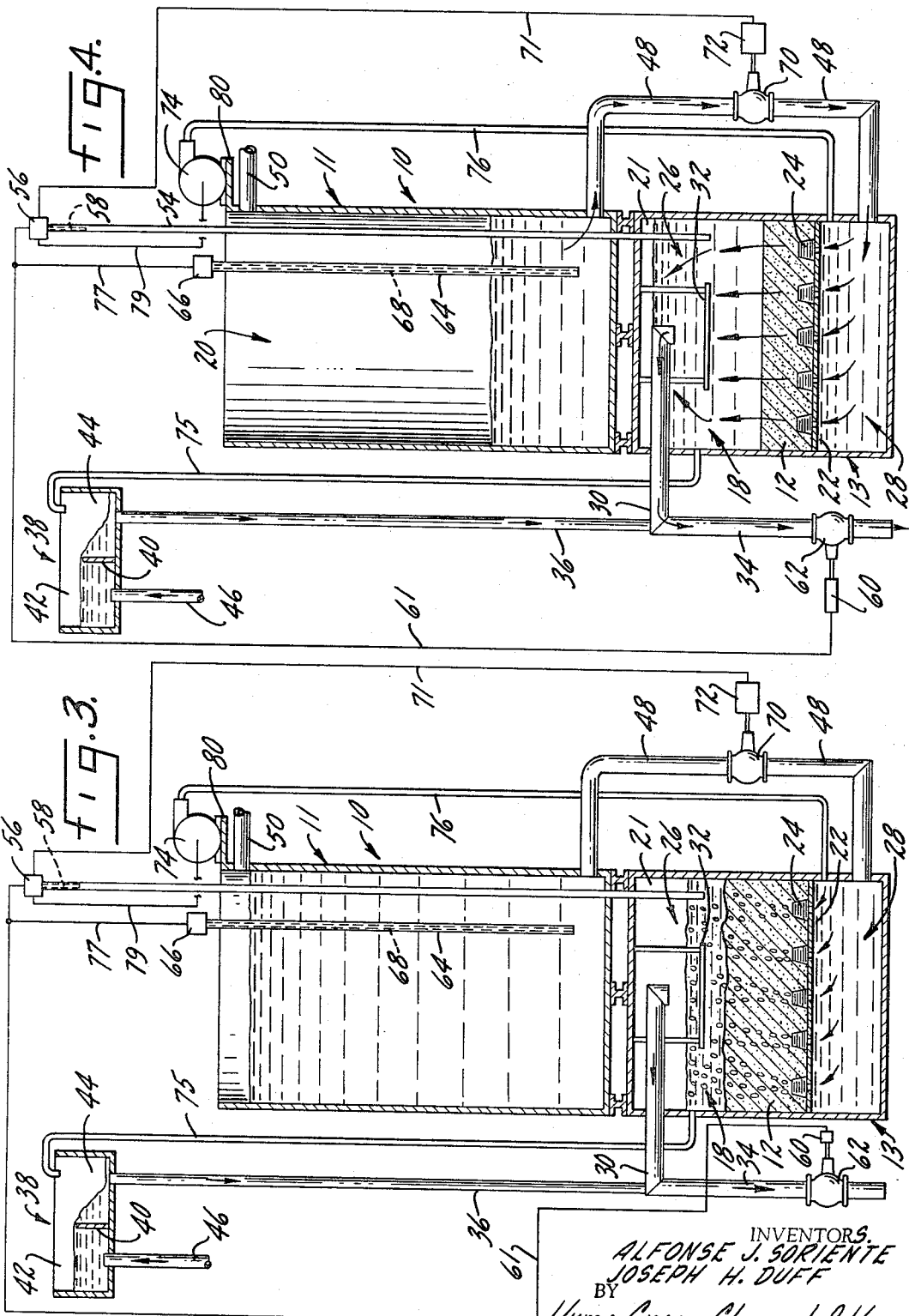

3,342,334
Patented Sept. 19, 1967

3,342,334
FILTER AND SCOURING GAS BLOWER SYSTEM
Alfonse J. Soriente, Gillette, and Joseph H. Duff, Basking Ridge, N.J., assignors to Union Tank Car Company, Chicago, Ill., a corporation of New Jersey
Filed May 27, 1964, Ser. No. 370,652
The portion of the term of the patent subsequent to July 12, 1983, has been disclaimed
2 Claims. (Cl. 210—108)

This invention relates to an apparatus for filtering liquids with a filter bed and, more particularly, to a gas blower system for gas scouring a filter.

A typical method of filtering a liquid is to pass the untreated or raw liquid through a filter chamber having a filter bed of suitable filter media, such as sand or other granular material well known in the art. The untreated liquid is passed into the inlet side of the filter chamber and as the liquid passes through the filter bed suspended matter in the liquid is removed. The filtered or treated liquid passes to the outlet side of the filter chamber through a suitable false bottom in the filter chamber to an underdrain compartment. The false bottom is designed to retain the filter bed but allow the filtered liquid to pass therethrough to the underdrain compartment. The filtered liquid passes from the underdrain compartment to the service line through suitable conduits.

After a period of time the filter bed becomes clogged and fouled with solid, foreign material removed from the untreated liquid during filtration and, accordingly, becomes less efficient. As the filter bed becomes clogged, the pressure differential between the upstream side and the downstream side of the filter bed increases. Thus, the head loss or increased pressure drop across the filter bed can be used as a means to determine when the filter bed should be cleaned.

One method of cleaning the filter bed is to backwash the bed with filtered liquid. The step involves providing a reverse flow of filtered liquid through the filter bed to carry the foreign matter in the filter bed to waste. Some materials filtered from the raw liquid are sticky in nature and tend to adhere to the filter media and simple backwashing is not sufficiently effective to clean the bed after the filtering cycle. This has been recognized in the art for many years. To overcome these deficiencies, a gas cleaning or scouring cycle, surface washer, or sub-surface washer, has been utilized before the backwashing cycle. In such a gas cleaning or scouring cycle, air or other suitable gas under pressure is introduced into the underdrain compartment of the filter chamber and passed upwardly through the filter bed. As the air passes through the filter bed, it violently agitates the filter media and thereby dislodges foreign material in the filter bed and foreign material on the filter media. The backwash liquid then removes the foreign material from the filter chamber.

Heretofore the equipment for effecting an air scouring cycle included a gas blower, such as an air blower, a gas line connecting the underdrain compartment with the gas blower, and a valve in the gas line to initiate and terminate the gas scouring cycle. The valve was operated manually or with automatic control means well known in the art. In either case the valve in the gas line increases the capital expenditure or operating costs, or both, for the filter. It is therefore desirable to provide a valveless gas blower system for gas scouring a filter bed of a filter.

Accordingly, it is an object of the present invention to provide a valveless gas blower system for gas scouring a filter bed of a filter.

It is another object to provide an apparatus for filtering a liquid with a filter bed wherein gas scouring of the filter bed is effected with a valveless gas blower system.

It is a further object to provide an apparatus for filtering a liquid containing solid impurities.

It is a still further object of the present invention to provide a system for gas scouring a filter bed of a filter chamber.

The invention, both as to its organization and method of operation, taken with further objects and advantages thereof, will be understood by reference to the following description taken in conjunction with the accompanying drawings, in which:

FIGURE 1 is a side elevational view, partially in section, illustrating a filter embodying the features of the present invention, the filter being illustrated during the filtering or service cycle;

FIGURE 2 is a cross-sectional view of the filter of FIGURE 1 taken along line 2—2 of FIGURE 1;

FIGURE 3 is a side elevational view, partially in section, illustrating the filter of FIGURE 1 during the gas scouring cycle; and FIGURE 4 is a side elevational view, partially in section, illustrating the filter of FIGURE 1 during the backwash cycle.

Referring now to the drawings, and more particularly to FIGURES 1 and 2, there is illustrated a filter 10 embodying the valveless gas blower system of the present invention. The filter 10 is of the type described and illustrated in co-pending application Ser. No. 320,149, filed Oct. 30, 1963, and now Patent No. 3,260,366, and assigned to the assignee of the present application. The filter 10 has a filter bed 12 of filter media through which the raw liquid is passed during the service or filtering cycle to remove solid foreign materials therefrom. Filtered or treated water from the filter 10 is passed to service. After the filter bed 12 has become clogged with foreign particles removed from the raw liquid, a gas scouring cycle is automatically initiated with the gas blower system of the present invention whereby air is passed upwardly through the filter bed 12 to dislodge foreign matter in the filter bed 12 and on the filter media. After the filter bed 12 has been gas scoured, the filter bed 12 is backwashed with treated liquid to remove the foreign material from the filter bed 12. The filter 10 is then ready to begin the filtering cycle again.

More specifically, the filter 10 comprises an upper, open cylindrical tank 11 mounted by suitable means upon a lower, closed cylindrical tank 13. The tank 11 forms a backwash storage chamber 20 while the tank 13 forms a filter chamber 18. The filter bed 12 of suitable filter media, such as sand or the like, is situated in the filter chamber 18 on a false bottom member 22 with strainer means 24, is is well known in the art. In this manner, an inlet compartment 26 and an underdrain compartment 28 are formed above and below, respectively, the filter bed 12 in the filter chamber 18.

A transfer conduit 30 extends into and communicates with the inlet chamber 26 to carry raw liquid into the filter chamber 18. As will be more apparent hereinafter, the transfer conduit 30 is also utilized to remove backwash liquid and scouring gas from the filter chamber 18 and the inlet chamber 26. Within the inlet chamber 26 there is mounted a baffle 32 which functions to distribute incoming raw liquid from the transfer conduit 30 evenly across the filter bed 12. Thus, during the service cycle, raw liquid from the transfer conduit 30 flows past the baffle 32 into the filter chamber 18 and through the filter bed 12 and the strainers 24 into the underdrain compartment 28. The insoluble materials suspended in the raw liquid are thereby extracted and retained in the filter bed 12.

An inlet pipe 36 is connected to the transfer conduit 30 and extends upwardly to a height above the backwash storage chamber 20. The inlet pipe 36 is connected to an overflow weir-type inlet head box 38. The inlet head box 38 is a rectangular tank having a weir or partition 40 dividing the tank into compartments 42 and 44. A pipe 46 for raw liquid communicates with the compartment 42 and transfers the raw liquid into the compartment 42. The raw liquid overflows the weir 40 into the chamber 44 and the inlet pipe 36. As the raw liquid overflows or cascades over the weir 40, air is entrained in the raw liquid.

The raw liquid, therefore, passes from a suitable source through the line 46 into the chamber 42 of the inlet head box 38, overflows the weir 40 and passes through the chamber 44, the inlet pipe 36 and the transfer conduit 30 to the inlet chamber 26. The raw liquid passes through the filter bed 12 and the treated water is recovered in the underdrain compartment 28. The treated water passes from the underdrain compartment to a connecting duct 48 which communicates with the bottom of the backwash storage chamber 20. The filtered liquid passes from the connecting duct 48 into the backwash storage chamber 20. A service outlet pipe 50 communicates with the top of the backwash storage chamber 20. The backwash storage chamber 20 fills until the filtered liquid reaches a level of the service outlet pipe 50, at which time the treated liquid passes to the service outlet pipe 50. The liquid in the backwash storage chamber 20 is used to clean the filter bed 12 during the backwash cycle.

A high level control pipe 54 communicates with the inlet chamber 26 of the filter chamber 18. The control pipe 54 is a vertically extending pipe extending through the backwash storage chamber 20, as shown in the drawings, or positioned outside the filter apparatus 10. At its upper end, which extends above the high liquid level in the backwash storage chamber 20, the high level control pipe 54 has a high level sensing switch 56 with a probe 58. This switch 56 is actuated when liquid, rising in the high level pipe 54, contacts the probe 58. The point at which the high level control switch 56 is actuated represents a predetermined pressure drop across the filter bed 12.

The high level control switch 56 is electrically connected with an electrical actuating means 60, as indicated diagrammatically by line 61. The electrical actuating means 60 is in turn connected to and mechanically controls the opening and closing of a butterfly valve 62 or the like positioned in a backwash line 34 connected to the inlet pipe 36 and the transfer conduit 30. The high level control switch 56 is also electrically connected wtih a timer-valve control mechanism 72 as indicated diagrammatically by line 71. The timer-valve control mechanism 72 controls the opening and closing of valve 70. The valve 70 is in the connecting duct 48 and may be a butterfly valve or other suitable valve as will be understood by one with ordinary skill in the art.

The valveless gas blower system of the present invention includes an air blower 74 and a valveless gas line 76. The gas line 76 communicates with the underdrain chamber 28 of the filter chamber 18 and is connected to the air blower 74, which is mounted upon a platform 80 attached by suitable means to the side of the tank 11. The particular type of gas or air blower utilized is a matter of choice within the ordinary skill of one in the art.

The air blower 74 is positioned above the level at which the service outlet pipe 50 communicates with the backwash storage chamber 20, i.e., above the uppermost level reached by the liquid in the tank 11, to prevent liquid from entering the blower 74. Preferably, the blower 74 is positioned above the level that the liquid could obtain in the filter system if operational failures occurred. For example, in the illustrated filter system it would be preferable to have the blower 74 positioned above the inlet head box 38 since liquid could not rise above that level even if, for some reason, valves 62 and 70 are closed at the same time. The blower 74 has an automatically operated on-off switch means well known in the art (not shown) which is actuated by the high level control switch 56 to which it is electrically connected as indicated diagrammatically by line 79. When so actuated the air blower operates for a predetermined period of time and then automatically shuts itself off. The air output pressure of the blower 74 when operating has been adjusted so that it is greater than the liquid head in the underdrain compartment 28 during the gas scouring cycle when the valve 62 is open and the valve 70 is closed. Preferably, the air output pressure of the blower 74 has also been adjusted so that it is less than the pressure in the underdrain compartment 28 during the service cycle. In this manner air from the air blower 74 will pass into the underdrain compartment 28 and upwardly through the bed 12 during the gas scouring cycle.

When the high level sensing switch 56 is actuated, an electrical impulse is transferred to the electrical actuating means 60 and the timer-control valve mechanism 72. This causes the electrical actuating means 60 to open the valve 62 rapidly. Simultaneously, the timer-control valve mechanism 72 causes the valve 70 to close slowly and the air blower 74 is actuated. After the valve 70 has closed, the filter 10 goes through the gas scouring cycle (FIGURE 3) wherein air from the air blower 74 passes through the line 76 and upwardly through the filter bed 12 to dislodge foreign material therein. The air passes out of the filter chamber 18 through the transfer conduit 30 (and the line 34) and a vent tube 75 as will be explained more fully hereinafter. After a predetermined period of time, the air blower 74 shuts off and the timer-control valve mechanism 72 automatically causes the valve 70 to open. The backwash cycle begins.

During the backwash cycle (FIGURE 4), the filtered liquid in the backwash storage compartment 20 will flow through the connecting duct 48 and the valve 70 into the underdrain compartment 28 of the filter chamber 18. The backwash liquid flows upwardly through the filter bed 12 and passes through the transfer conduit 30 to the inlet pipe 36 and out to drain through the backwash pipe 34 and the valve 62. The backwash liquid carries the foreign matter from the filter bed 12 with it.

A low level control pipe 64 extends downwardly into the backwash storage chamber 20 and has its bottom outlet communicating with the lower portion of the backwash storage chamber 20. A low level sensing switch 66 is attached to the top of the low level control pipe 64 and has a probe 68 which extends downwardly to the outlet of the pipe 64. The low level sensing switch 66 is excited or actuated when liquid in the backwash storage chamber 20 drops to a level lower than the end of the probe 68. The low level sensing switch 66 is also electrically connected with the electrical actuating means 60 as indicated diagrammatically by a line 77 connected to the line 61. When the low level sensing switch 66 is actuated, an electrical impulse is transferred to the electrical actuating means 60. This actuates the electrical actuating means 60 to close the valve 62. In this manner, when the level of filtered liquid in the backwash storage chamber 20 has dropped to a level below the end of the probe 68, the valve 62 is closed and the service cycle of the filtering apparatus 10 begins again.

Considering the operation of the filtering apparatus 10 in more detail, during the filtering or service cycle of the filtering apparatus 10 the valve 62 is closed. In this manner, as shown in FIGURE 1, the raw liquid with entrained air passes through the inlet pipe 36 and the transfer conduit 30 into the inlet chamber 26 of the filter chamber 18. The raw liquid passes through the filter bed 12 and into the underdrain compartment 28 from which it flows upwardly through the connecting duct 48, as the control valve 70 is open. The backwash storage chamber 20 fills with filtered liquid until it has reached the level of the service outlet pipe 50 and thereafter filtered liquid flows out of the service outlet pipe 50. During the service cycle it is therefore apparent that the pressure in the underdrain compartment 28 is equal to the head of liquid in the connecting pipe 48 and the backwash storage compartment 20, i.e., the pressure necessary to force liquid up the connecting duct 48 and out the outlet pipe 50.

The entrained air in the raw liquid is released from the raw liquid in the inlet chamber 26 of the filter chamber 18. This released air accumulates and causes a void space 21 in the inlet chamber 26, as shown in FIGURE 1. The amount of air that is permitted to accumulate, i.e., the size of the void space 21, is controlled by the vent pipe 75 which communicates with the inlet chamber 26 at substantially the level it is desired to maintain the liquid in the inlet chamber 26. Excess air accumulating in the inlet chamber 26 is withdrawn through the vent pipe 75.

During the service cycle, the collection of foreign material in the filter bed 12 will increase the pressure drop across the filter bed 12 and thus create a pressure differential between the inlet chamber 26 and the underdrain compartment 28. This pressure differential will be represented by a rise of the liquid in the high level sensing pipe 54. When the pressure drop across the filter media of the filter bed 12 reaches a predetermined amount, the liquid in the high level sensing pipe 54 will have risen to a point where it contacts the probe 58. This actuates the switch 56, and accordingly the actuating means 60, the timer-control valve mechanism 72 and the blower 74, causing the valve 62 to open rapidly, the valve 70 to close slowly and the blower 74 to turn on. With the valves 62 and 70 open, backwash or filtered liquid in the backwash storage chamber 20 flows through the riser pipe 48 into the filter chamber 18. This flow of backwash liquid will continue until the valve 70 closes. The closing of the valve 70 is timed so that sufficient backwash liquid flows into the filter chamber 18 to at least fluidize the bottom of the filter bed 12. Slight fluidization of the filter bed 12 makes the subsequent gas scouring cycle more effective.

When the valve 62 opens, the pressure in the underdrain compartment 28 is substantially the level of the liquid in the cylindrical tank 13 and therefore substantially less than the pressure in the underdrain compartment 28 during the service cycle. The air pressure from the blower 74 is greater than the pressure of the liquid in the underdrain compartment 28 and therefore air will pass into the underdrain compartment 28 and rapidly up through the filter media in the filter bed 12. This initiates the gas scouring cycle illustrated in FIGURE 3. The air entering the underdrain compartment 28 and passing up through the filter bed 12 travels at a relatively high velocity. The air agitates the filter bed 12 and causes the foreign particles which have collected therein to become disengaged from the filter media. As the air passes through the filter bed 12, filter media will become entrained in the air. However, the filter media will disengage from the air when the air enters the air space 21 in the upper part of the filter chamber 18. In this air space 21 the filter media entrained with the scouring air will drop back into the liquid in filter chamber 18. The baffle 32 also assists in disengaging filter media from the scouring air. The scouring air passes out of the tank 13 through the transfer conduit 30 and the inlet pipe 36 or the vent tube 75, or both.

After a predetermined period of time, the timer-valve control mechanism 72 will automatically cause the valve 70 to open and simultaneously the air blower 74 will turn off. The backwash cycle begins. With the valve 70 open, the filtered liquid in the backwash storage chamber 20 passes through the connecting duct 48, the underdrain compartment 28, the filter bed 12, the transfer conduit 30 and the drain pipe 34 to drain as shown in FIGURE 4. This flow of backwash liquid through the filter bed 12 removes the foreign material which accumulated therein during the service cycle.

When the filtered liquid stored in the backwash storage compartment 20 reaches a level below the end of the probe 68 the switch 66 is actuated whereby electrical actuating means 60 closes the valve 62. Once the valve 62 has been closed the service cycle begins and entire operation of the filter apparatus 10 being repeated. During the service cycle, the gas space 21 left after the backwashing cycle is, of course, enlarged by the release of the entrained air carried by the raw liquid. In this manner a gas space 21 is provided of sufficient size so that filter media will disengage from the scouring gas during the next gas scouring cycle.

The filtering apparatus 10 may be used to filter water streams, sugar solutions, hydrocarbon streams and the like as will be readily appreciated by one with ordinary skill in the art. The particular filter media employed is a matter of choice, the selection of the filter media being dependent, of course, upon the liquid to be treated and the impurities contained therein. Scouring gases other than air may be employed, such as nitrogen, oxygen and the like, although air is preferred because of lower operating costs. Furthermore, the valves 70 and 62, the switches 66 and 56, the electrical actuating means 60, the timer-control valve mechanism 72 and the on-off mechanism for the blower 74 do not per se constitute a part of the present invention, as there are a myriad of suitable means for performing the functions of these components of the filtering apparatus 10. Accordingly, one with ordinary skill in the art could select suitable valves and control means to operate the filtering apparatus 10 in accordance with the concepts of the present invention described herein.

The valveless gas blower system of the present invention is particularly adapted to provide gas scouring for a plurality of filters 10. In such a system the blower 75 is connected to the underdrain compartment of each filter 10 by a plurality of gas lines. Only one filter 10 is gas scoured and backwashed at any time. Each filter 10 begins its gas scouring and backwashing cycle by actuation of the high level sensing means 56 in the manner described hereinbefore. The blower is thereby turned on, causing gas under pressure to pass into the underdrain compartment of this filter, upwardly through the filter bed and out of the filter in the manner described hereinbefore. The air pressure of the blower has been set at a predetermined pressure which is greater than the pressure in the underdrain compartment of the filters 10 during the gas scouring cycle but less than the pressure in the underdrain compartment of the filters 10 during the service cycle. The other filters are at this time in their service cycle and the pressure in their underdrain compartments will be greater than the pressure exerted by the blower and air will therefore not enter their underdrain compartments. Accordingly, air will only enter the underdrain compartment of the filter going through the gas scouring cycle. In all other respects, however, the gas blower system is the same as described in detail hereinbefore.

The valveless gas blower system may be modified to place the gas blower below the point at which the service outlet pipe 50 communicates with the backwash storage compartment 20. In such instances the gas line must extend upwardly from the underdrain compartment to above the level at which the outlet pipe 50 communicates with the backwash storage compartment 20 and loop downwardly to the gas blower to prevent water flow into the blower. Preferably, the loop will extend above the level that the liquid could obtain in the filter system if operational failures occurred. In the illustrated system this would be above the inlet head box 38.

The service outlet pipe 50 may, of course, be connected directly to the connecting duct 48. In such instances, there is a vertical extension of the connecting duct 48 to which the outlet pipe 50 is attached. As the service cycle begins filtered liquid will enter the backwash storage chamber 20 until the liquid level therein reaches that of the outlet pipe 50. Then the filtered liquid will by-pass the backwash storage chamber 20 and go directly to the service line.

While the embodiments described herein are at present considered to be preferred, it will be understood that various modifications and improvements may be made therein and it is intended to cover in the appended claims all such modifications and improvements as fall within the true spirit and scope of the invention.

What is claimed is:

1. Liquid filtering apparatus having a service cycle, a gas scouring cycle, and a backwash cycle comprising a filter chamber having an inlet side and an outlet side, a filtered liquid storage chamber above said filter chamber, pipe means connecting said storage chamber with said outlet side of said filter chamber to receive filtered liquid therefrom, means connecting the inlet side of said filter chamber to a source of liquid to be filtered, service outlet means for filtered liquid communicating with said outlet side of said filter chamber, normally closed backwash discharge outlet means connected to the inlet side of said filter chamber, valve means to open and close said pipe means connecting said storage chamber and service outlet means to said outlet side of said filter chamber, said outlet side of said filter chamber being at a high pressure during said service cycle and a low pressure during said gas scouring cycle, an actuatable gas blower connected to said outlet side by a valveless gas line, said gas line extending above said service outlet means, said gas blower when actuated exerting a pressure greater than said low pressure whereby gas is forced into said outlet side and to said inlet side of said filter chamber during said gas scouring cycle, means to open said backwash discharge means at a level below said service outlet means and to close said valve means to initiate said gas scouring cycle, said valve means closing after said backwash discharge means has been opened, and means for initiating the backwash cycle thereafter by opening said valve means.

2. The filtering apparatus of claim 1 wherein said service outlet means communicates directly with said storage chamber, and a line interconnecting said outlet side of said filter and said storage chamber, said valve means being in said line.

References Cited
UNITED STATES PATENTS

| | | |
|---|---|---|
| 2,748,075 | 5/1956 | Hovlid. |
| 3,080,154 | 3/1963 | Tanner. |
| 3,260,366 | 7/1966 | Duff et al. |

FOREIGN PATENTS

| | | |
|---|---|---|
| 555,580 | 3/1923 | France. |
| 910,694 | 6/1946 | France. |
| 578,811 | 1/1945 | Great Britain. |
| 253,483 | 11/1948 | Switzerland. |

REUBEN FRIEDMAN, *Primary Examiner.*

D. M. RIESS, *Assistant Examiner.*